P. B. HEWLETT.
MILKING MACHINE.
APPLICATION FILED APR. 7, 1919.

1,386,498.

Patented Aug. 2, 1921.
2 SHEETS—SHEET 1.

WITNESS
J. H. Morgan

INVENTOR
Palmer B. Hewlett.
BY White & Pratt
his ATTORNEYS

P. B. HEWLETT.
MILKING MACHINE.
APPLICATION FILED APR. 7, 1919.
1,386,498.
Patented Aug. 2, 1921.
2 SHEETS—SHEET 2.
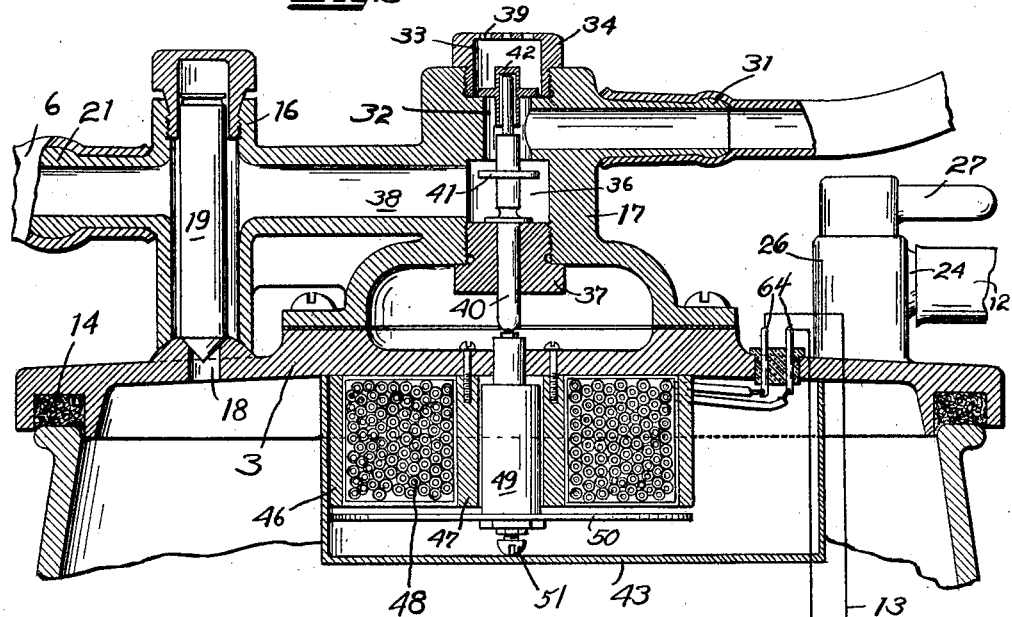
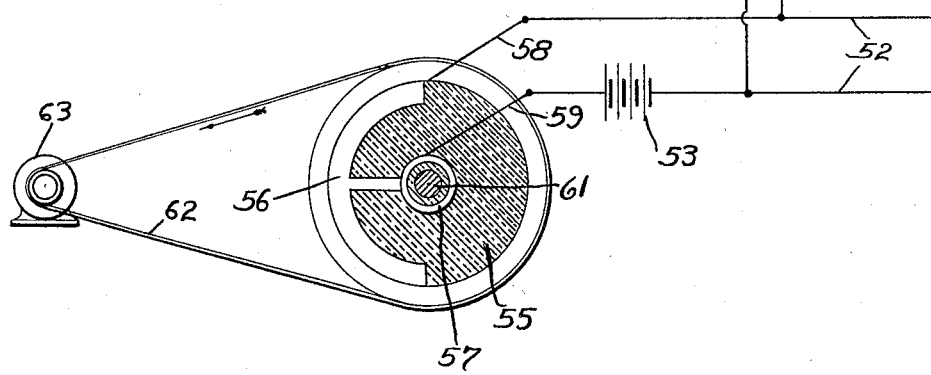
WITNESS
J. H. Morgan
INVENTOR
Palmer B. Hewlett.
BY White & Prost
his ATTORNEYS

UNITED STATES PATENT OFFICE.

PALMER B. HEWLETT, OF HOLLISTER, CALIFORNIA.

MILKING-MACHINE.

1,386,498. Specification of Letters Patent. Patented Aug. 2, 1921.

Application filed April 7, 1919. Serial No. 287,944.

*To all whom it may concern:*

Be it known that I, PALMER B. HEWLETT, a citizen of the United States, and a resident of Hollister, county of San Benito, and State of California, have invented a new and useful Milking-Machine, of which the following is a specification.

My invention relates to apparatus for milking cows.

An object of the invention is to provide a milking machine in which improved means are provided for releasing and establishing the vacuum in the annular chamber surrounding the inner wall of the teat cup.

Another object of the invention is to provide electro-magnetic means for directly actuating the pulsator which operates to release and establish the vacuum in the annular chamber in which the flexible teat cup is disposed.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Fig. 3 is a vertical section through portions of the apparatus, including the pulsator and interrupter for controlling the operation thereof.

Figure 1:
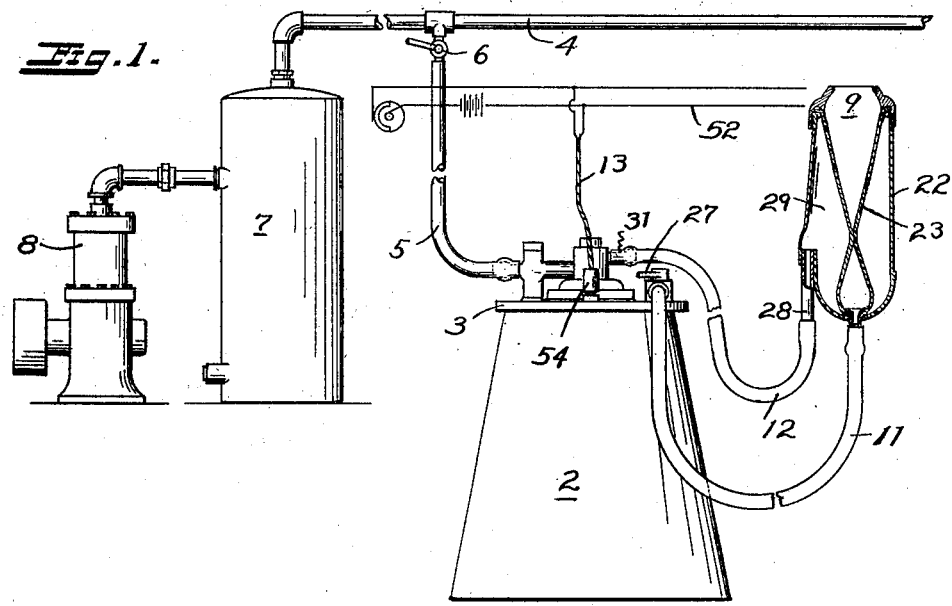
Figure 1 is an elevation partly in diagrammatic form of the apparatus of my invention, showing a single teat cup in section. Portions of the connections are broken away to reduce the size of the figure.

In general terms my milking machine comprises a milking pail 2 surmounted by a closure plate or cover 3 upon which portions of the operating mechanism are arranged and in which means are provided for connecting the interior of the pail to the vacuum line 4 by the flexible conduit 5 controlled by the valve 6. The vacuum line is connected to the vacuum tank 7 from which the air is exhausted by the pump 8 driven by any suitable prime mover. A plurality of teat cups, one of which is shown in Fig. 1 and generally designated by the character 9, are connected by two flexible conduits 11 and 12 to the interior of the pail and to the teat cup operating mechanism respectively. Means best shown in Fig. 3 are also provided for regularly interrupting the electric circuit 13 from which the teat cup operating mechanism is energized.

The cover plate 3 is provided with a permanently attached gasket 14, adapting the cover to be seated upon the pail with an air tight joint when the pail is vacuumized. A hollow stud 16, forming part of the casing 17, is alined with the passage 18, formed through the cover, and a check valve 19 is arranged in the stud to control the flow of air through said passage. A nipple 21 upon the stud provides means for attaching the flexible conductor 5 to connect the pail with the vacuum line.

The teat cup 9 comprises a cylindrical casing or shell 22 within which is a flexible casing 23 adapted to inclose the teat. The interior casing is connected to the milk pipe 11, which slips upon the nipple 24 formed on the hollow stud 26 opening into the pail. A valve operated by the handle 27 controls the passage through the stud. A tube 28 connected to the outer casing and opening into the chamber 29 between the two casings is connected by the air line 12 with the nipple 31 formed on the casing 17 mounted on the cover of the pail.

Means including mechanism constituting a two-way valve are provided for alternately connecting the air line 12 with the vacuum line and with the atmosphere so that the chamber 29 is vacuumized and the vacuum released at similar intervals. It will be understood that a vacuum is maintained continuously in the milk pipe 11. With a similar vacuum in the chamber 29, the wall of the casing 23 is distended by the inclosed teat from which the milk is sucked. With the release of the vacuum in the chamber 29 the inner casing collapses about the teat as shown in Fig. 1 closing the casing below the teat and shutting off the sucking action, and at the same time applying a gentle progressive squeezing or massage to the teat, which stimulates the action of the milk glands during the refilling of the milk pocket in the udder. This must occur before the chamber 29 is again vacuumized to permit the casing 23 and the teat to be distended. Since milk is normally secreted into the milk pockets of the udder chiefly during the actual process of milking and in time with the pulsations of blood from the heart, it is advisable to effect the alternate connection of the chamber 29 with the vacuum line and with the atmosphere at similar intervals so that the milk pocket is emptied as frequently as it is filled. The casing 17 incloses a chamber 32, opening at the top into the chamber 33 formed by the plug 34, and at the bottom into the chamber 36, the lower end of which is closed by the plug 37. The chamber 32 is smaller than the upper and lower chambers so that shoulders are formed surrounding both upper and lower ends of the chamber 32. The nipple 31 opens into the chamber 32, and a passage 38 connects the chamber 36 to the passage in the hollow stud 16. Apertures 39 connect the chamber 33 with the outer air.

Slidably disposed in the plug 37 is a valve stem 40 provided with a flange 41 adapted to seat on the shoulder surrounding the lower end of the chamber 32, when the stem is pushed upwardly. The upper end of the stem carries the flanged thimble 42, which may be secured to the stem or which may be loosely mounted thereon, adapted to seat on the shoulder surrounding the upper end of the chamber when the stem drops to its lower position. From the structure just set forth it will be clear that reciprocation of the valve stem 40 alternately connects the nipple 31 with the chamber 33 and 36; that is, chamber 29 is alternately connected with the outer air and the vacuum line 4.

Disposed within the tight casing 43 attached to the under side of the cover plate 3 is an electro-magnet comprising the spaced concentric rings 46 and 47, windings 48, core 49 and armature plate 50. A screw 51 in the end of the core limits the downward movement of the core by engagement with the casing 43, and the upper end of the core engages the lower end of the stem 40. With the energizing of the magnet, the armature is drawn upwardly, pushing up the stem and closing the passage between the nipple 31 and the vacuum line and opening the passage to the outer air. Deënergizing the magnet results in a falling of the core and stem, closure of the passage to the outer air and opening of the passage to the vacuum line. The windings of the magnet are connected by conductors 13 to the electric line circuit 52 energized in any suitable way such as by the battery 53. A plug 54, Fig. 1, of well known type, provides a detachable connection with the circuit 52. In order to energize and deënergize the magnet to effect the alternate connection of the chamber 29 with the vacuum line and the outer air, an interrupter operating at the required speed is inserted in series in the circuit 52. This interrupter consists of a disk 55 of non-conducting material having a peripheral contact segment 56 electrically connected to the conducting disk 57. Brushes 58 and 59 engage the disks 55 and 57 respectively, which are mounted upon a shaft 61, rotated by the belt 62, driven from any suitable prime mover such as the motor 63, at a speed such that the circuit through the magnet coils is made and broken at the desired rate. The interrupter contact segment 56 may span an arc of 180° or less, and I have found that on some herds it is advantageous to make the segment shorter than 180° to produce a longer squeeze and a shorter pull on the teat.

With the making and breaking of the circuit alternately energizing and deënergizing the magnet, the valve stem is operated to alternately connect the chamber 29 of the teat cup to the open air and to the vacuum line, thus permitting the wall 23 of the teat cup to collapse about the teat and to be distended in the manner already explained, to effect the extraction of the milk.

The valve mechanism and related parts constitute a pulsator acting to effect alternate suction and compression of the teat, very closely simulating the action of a calf, which action may be taken to be the perfect and natural milking method. The pulsator is without springs or other parts injured or clogged by milk which may accidentally get into the air passages, and all portions are readily removable for the purpose of cleaning.

The terminals 64 of the magnet winding pass through the cover plate 3 and are removably connected to the wires of the circuit 13 by suitable connectors. After the parts are assembled, the casing 43 is preferably soldered to or otherwise attached to the cover 3 by a tight joint, so that milk or moisture cannot enter the casing and so that the cover with its attached parts may be sterilized by boiling or otherwise without permitting the entry of liquid or moisture into contact with the magnet winding.

After the pail is full of milk the valve 6 and the valve controlled by handle 27 are closed and the flexible conduits and the plug 54 disconnected, when the pail may be carried out, the cover plate being sealed to the pail until the release of the vacuum within the pail by movement of the handle 27.

Figure 2:
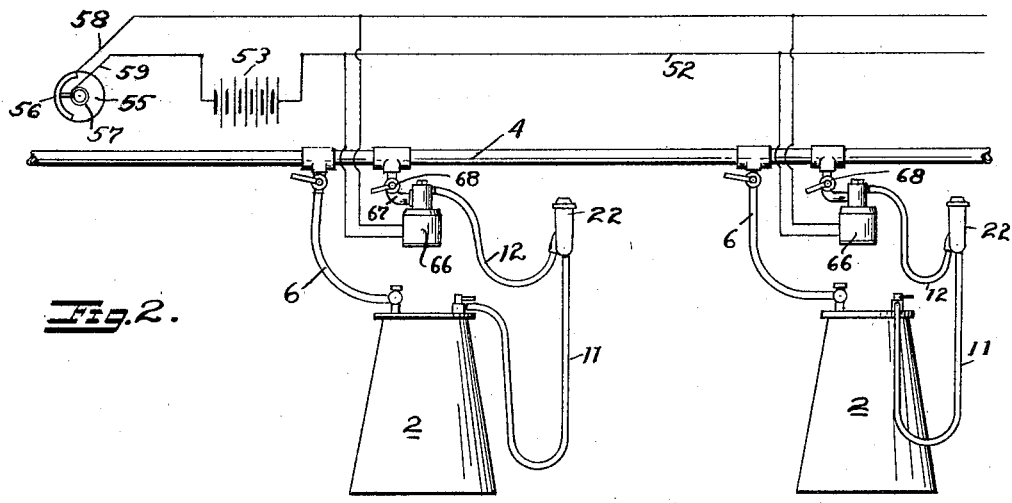
Fig. 2 is an elevation partly in diagrammatic form of a modified arrangement of the apparatus.

Instead of placing a pulsator on the cover plate of each pail, the pulsator mechanism may be arranged in a separate casing 66 disposed near the vacuum line 4 as shown in Fig. 2, and connected thereto by the conductor 67 controlled by the valve 68.

In either construction it will be clear that the regularity of action of the pulsator for each set of teat cups is unaffected by variations in the pressure within the vacuum line or pails, or by the connection or disconnection of other pails.

I claim:

1. In a milking machine, a chambered casing, a conduit connected to said casing, means for vacuumizing said conduit, a second conduit connected to the casing, a pair of relatively movable valves in said casing for alternately placing the second conduit in communication with the open air and with said vacuumized conduit, a plunger arranged below and adapted to actuate said valves, an armature secured to said plunger and an electromagnet operatively associated with said armature and disposed below said casing.

2. In a milking machine, a milk receptacle, a cover for said receptacle, a chambered casing on said cover, a conduit connecting said casing and said receptacle with a source of vacuum, a check valve adapted to prevent reduction of vacuum in said conduit from being transmitted to said receptacle, a conduit connecting said casing with a teat cup, an aperture in said casing opening to the air, a valve in said casing adapted to alternately place the second conduit in communication with the air and with said vacuumized conduit, an electromagnet arranged on the under side of said cover, and a plunger actuated by the electromagnet for raising said valve.

3. In a milking machine, a milk receptacle cover, a pulsator mounted on said cover, an electromagnet arranged on the under side of said cover, a plunger actuated by said electromagnet adapted to contact with and raise said pulsator, and a closed housing inclosing said electromagnet.

4. In a milking machine, a milk receptacle cover, a pulsator mounted on said cover, an electromagnet arranged on the under side of said cover, a plunger actuated by said electromagnet adapted to contact with and raise said pulsator, and a housing forming a tight joint with the underside of the cover inclosing said electromagnet.

5. In a milking machine, a milk receptacle cover, a chambered casing on said cover, a vertically movable pulsator in said casing, an electromagnet arranged in said cover beneath said pulsator, and a plunger associated with said electromagnet alined with said pulsator and adapted to contact with and raise said pulsator.

6. In a milking machine, a milk receptacle cover, a chambered casing on said cover, a vertically movable pulsator in said casing, an electromagnet arranged on said cover below said pulsator, an armature plate associated with said electromagnet and a core on the armature plate adapted to contact with and raise said pulsator.

7. In a milking machine, a milk receptacle cover, a chambered casing on said cover, said chamber being in communication with the atmosphere, a conduit connecting said chamber with a teat cup, a valve stem in said casing, a valve fixed to said stem adapted to control communication between said chamber and said vacuumized conduit, a valve movably mounted on said stem adapted to control communication between said chamber and the atmosphere, an electromagnet arranged below said stem and a plunger in said electromagnet adapted to contact with and raise said stem.

8. In a milking machine, a pulsator, a teat cup, a connection between said pulsator and said teat cup, an electromagnet for operating said pulsator, a circuit for said electromagnet, and an interrupter in said circuit constructed to open and close the circuit alternately, the period of duration of circuit interruption being greater than the period of duration of circuit closure whereby said teat cup is caused to produce upon the teat a squeeze of longer duration than the pull.

9. In a milking machine, a milk receptacle, a vacuum pump connected to said receptacle and adapted to maintain a vacuum therein, a flexible teat cup, a rigid casing surrounding said teat cup, a conduit connecting said receptacle and said teat cup, a conduit connecting the casing and the vacuum pump, a pulsator in said second conduit and adapted to alternately place said second conduit in communication with the vacuum pump and with the atmosphere, an electromagnet arranged adjacent said pulsator and a plunger associated with said electromagnet adapted to contact with and raise said pulsator.

10. In a milking machine, a milk receptacle, a vacuum pump connected to said receptacle and adapted to maintain a vacuum therein, a flexible teat cup, a rigid casing surrounding said teat cup, a conduit connecting said receptacle and said teat cup, a conduit connecting the casing and the vacuum pump, a pulsator in said second conduit and adapted to alternately place said second conduit in communication with the vacuum pump and with the atmosphere, an electromagnet arranged below said pulsator, an armature associated with said electromagnet, a core on said armature alined with said pulsator and arranged to contact with and move said pulsator, an electric circuit for said electromagnet and means for interrupting said circuit.

11. In a milking machine, the combination of a milk receptacle cover provided on its upper side with a chambered casing, means for inducing a vacuum in said casing, a conduit leading from said casing to a teat cup, a valve stem disposed in said casing, a pair of valves carried thereby, one of said valves being movable on said stem relatively to the other, an electromagnet mounted below said casing, a plunger disposed in abutting relation to said valve stem and adapted to be actuated by said electromagnet, and means for intermittently energizing said magnet to actuate said valve stem whereby through the instrumentality of said valves, said teat conduit is caused to communicate alternately with the vacuum in said casing and with the atmosphere.

12. In a milking machine, the combination of a milk receptacle cover provided on its upper face with a chambered casing, means for inducing a vacuum in said casing, a valve stem reciprocable in said casing, an electromagnet carried by and beneath said cover, a plunger actuated by said electromagnet, said plunger being disposed in operative relation to said valve stem, a valve fixed on said stem, a second valve loosely carried by said stem, a seat for each of said valves, and a teat cup conduit communicating with said chamber between said seats, the actuation of said valve by said electromagnet causing said conduit to be alternately connected with the vacuum in said casing and with the atmosphere.

In testimony whereof, I have hereunto set my hand at San Francisco, Cal., this 29th day of March 1919.

PALMER B. HEWLETT.

In presence of—
H. G. Prost.